United States Patent

[11] 3,619,392

[72] Inventors: Wolfgang Metzner, Krefeld; Hans Rudolph, Krefeld-Bockum; Wolfgang Deninger, Krefeld-Bockum; Manfred Patheiger, Krefeld-uerdingen, all of Germany
[21] Appl. No.: 842,728
[22] Filed: July 17, 1969
[45] Patented: Nov. 9, 1971
[73] Assignee: Farbenfabriken Bayer Aktiengesellschaft Leverkusen, Germany
[32] Priority: Aug. 10, 1968
[33] Germany
[31] P 17 69 952.4

[54] PROCESS FOR THE CURING OF MOLDING AND COATING MASSES BASED ON UNSATURATED POLYESTERS AND COPOLYMERIZABLE MONOMERIC COMPOUNDS BY ELECTRON RADIATION AND ADDITIONALLY CONTAINING PHOSPHINES, ARSINES AND STIBINES
2 Claims, No Drawings

[52] U.S. Cl. .................. 204/159.15, 117/93.31, 204/159.23, 204/159.24, 260/28, 260/40 R, 260/861, 260/865, 260/868, 260/870, 260/872

[51] Int. Cl. ............................................. C08d 1/00, C08f 1/16
[50] Field of Search ............................ 204/159.15, 159.23, 159.24; 260/865

[56] References Cited

UNITED STATES PATENTS

| | | | |
|---|---|---|---|
| 3,352,772 | 11/1967 | Mao | 204/159.24 |
| 3,331,761 | 7/1967 | Mao | 204/159.24 |
| 3,274,291 | 9/1966 | Raichle et al. | 260/865 |
| 2,921,006 | 1/1960 | Schmitz et al. | 204/159.15 |

Primary Examiner—Murray Tillman
Assistant Examiner—Richard B. Trever
Attorney—Connolly and Hutz ABSTRACT: The present invention relates to molding and coating masses comprising mixtures of unsaturated polyesters and copolymerizable monomers which are curable by electron radiation. According to the invention small amounts of phosphines, arsines or stibines are added to such masses, whereby the radiation dose necessary for curing the masses may be remarkably reduced.

PROCESS FOR THE CURING OF MOLDING AND COATING MASSES BASED ON UNSATURATED POLYESTERS AND COPOLYMERIZABLE MONOMERIC COMPOUNDS BY ELECTRON RADIATION AND ADDITIONALLY CONTAINING PHOSPHINES, ARSINES AND STIBINES

Since suitable devices for electron radiation have been available for about 15 years, polymerization of unsaturated compounds, including the curing of polyester molding and coating masses, by electron radiation has increasingly achieved importance. A detailed description of this technique can be found, for example, in the paper "On the Utilization of Irradiation Processing in Surface Coating and Related Applications" published by the firm Radiations Dynamics Inc., Westbury Industrial Park, Westbury, L.I. N.Y. 11590.

The special advantage of curing by electron radiation mainly consists in the short time required for curing, compared with conventional methods. A disadvantage of the process consists in that very high radiation doses are required. High radiation does not only mean a substantial economic burden, they may moreover cause serious destructions of the substrates to be coated. It is therefore of great interest to reduce the radiation dose required for curing.

Surprisingly, it has been found that the radiation dose can be reduced to about the half by the addition of certain compounds to the molding and coating masses. Suitable doses amount, for example, from about 5 to about 50 Mrad.

The object of the invention therefore comprises a process for the curing of molding and coating masses containing unsaturated polyesters and copolymerisable monomeric compounds, said process comprising irradiating with electrons such masses which contain phosphines, arsines or stibines as initiators.

Examples of such compounds are: triphenyl-phosphine, tritolyl-phosphine, diphenyl-phosphine, dibenzyl-phosphine, dioctyl-phosphine, phenyldimethyl-phosphine, diethylnaphthyl-phosphine, tributyl-phosphine, trioctyl-phosphine, tris-(hydroxyethyl)-phosphine, methylene-bis-diphenyl-phosphine, tricyclopentyl-phosphine, triphenyl-arsine, tribenzyl-arsine, trioctyl-arsine, triphenyl-stibine, tridiphenyl-stibine, trinaphthyl-stibine and tritolyl-stibine. Triphenyl-phosphine is particularly advantageous.

Molding and coating masses based on unsaturated polyesters and copolymerisable monomeric compounds with a content of phosphines, arsines and stibines are already described in U.S. Pat. No. 3,274,291. However, the object of the invention of that specification comprises a process for the production of moldings or coatings by curing (at room temperature) such masses which have been rendered "non-greening" and which contain ketone peroxides as catalysts, cobalt salts as accelerators and the phosphines etc. as coaccelerators. It was not possible to conclude therefrom that phosphines, arsines and stibines would act as initiators for the curing of polyester molding and coating masses by electron radiation.

Unsaturated polyesters in the meaning of the invention comprise, as usual, polycondensation produces obtained from $\alpha$, $\beta$-unsaturated dicarboxylic acids, such as maleic acid, fumaric acid, itaconic acid, mesaconic acid and citraconic acid, with polyhydric alcohols, such as ethylene glycol, diethylene glycol, propane-, butane-, hexane-diol, trimethylol-propane and pentaerythritol. Part of the unsaturated carboxylic acids can be replaced with saturated polybasic carboxylic acids, for example, succinic acid, glutaric acid, adipic acid, phthalic acid, tetrachloro-phthalic acid, hexachloro-endomethylene-tetrahydrophthalic acid and trimellitic acid. Other modifications can be achieved by the incorporation of monohydric alcohols, such as butanol and tetrahydrofurfuryl alcohol, and by the incorporation of monobasic acids, such as benzoic acid, oleic linseed oil fatty acid and dehydrated castor oil fatty acid. There may further be mentioned mixtures of unsaturated polyesters with monomeric unsaturated compounds containing, besides the radicals of $\alpha$, $\beta$-unsaturated dicarboxylic acids as constituents of the polyesters, also $\alpha$, $\beta$-unsaturated ether radicals, be it likewise as constituents of the polyesters, for example, according to British specification No. 810,222, be it as constituents of other components of the mixture, which are not only copolymerizable but also air-drying.

Suitable monomeric unsaturated compounds which can be copolymerized with the unsaturated polyesters are, for example, vinyl compounds, such as styrene, vinyl-toluene and divinyl-benzene; vinyl esters, such as vinyl acetate; unsaturated carboxylic acids and their derivatives, such as acrylic acid, acrylic ester and acrylonitrile; methacrylic acid and its corresponding derivatives; allyl esters, such as allyl acetate, allyl acrylate, phthalic acid diallyl ester, triallyl phosphate and triallyl cyanurate.

To increase the stability in storage, the molding masses may contain known inhibitors, for example, p-benzoquinone, 2,5-di-tert-butyl-quinone, hydroquinone, tert-butyl-pyrocatechol, 3-methyl-pyrocatechol and 4-ethyl-pyrocatechol, and also copper compounds, for example, copper naphthenate.

Polymerization catalysts, for example, peroxides, may be added in amounts of about 0.1–4 percent by weight. Suitable peroxides are, for example, tert-butyl perbenzoate, dicumyl peroxide, benzoyl peroxide, lauroyl peroxide, methyl ethyl ketone peroxide and cyclohexanone peroxide. To accelerate the curing, metal compounds such as cobalt, zirconium and vanadium naphthenate, or metal chelates, such as cobalt and zirconium methyl-acetonate, maya be added together with the peroxides. In every case where atmospheric oxygen hinders the polymerization, paraffin or wax or wax-like substances may be added in known manner. These substances float during the curing and prevent the access of the oxygen inhibiting the polymerization. For working up these products, a combined ultraviolet and electron radiation has proved particularly valuable.

To protect substrates which are sensitive to light, for example, light-colored woods, small amounts of conventional UV-absorbers may be added to the molding and coating masses. Furthermore, conventional carrier materials and fillers, as well as pigments and thixotropy agents, such as glass fibers, synthetic fibers, silicic acid, talc, titanium dioxide and iron oxide, may be present during the radiation polymerization. According to the invention, the aforesaid initiators are added to these polyester molding and coating masses in amounts of 0.1–5 percent by weight, preferably 0.5–2.5 percent by weight.

For curing, the said molding and coating masses are irradiated with electrons. The acceleration voltage must be adapted to the thickness of the layer. It can be comprised between about 100 and 3,000 kv. In most cases, acceleration voltages between 200 and 600 kv. are applied.

The parts given in the following examples are parts by weight.

EXAMPLE 1

An unsaturated polyester prepared by condensation of 152 parts maleic acid anhydride, 141 parts phthalic acid anhydride and 195 parts propane-diol-1,2 is mixed with 0.045 parts hydroquinone and dissolved in styrene to give a 65 percent solution. 100 parts of the resultant coating mass are admixed with 20 parts styrene and 1.5 parts of a 10 percent paraffin solution (m.p. 52°–54° C.). The solution obtained is then divided: batch A is mixed with 2 percent triphenyl-phosphine, referred to the coating mass; batch B is left without additive.

The two mixtures are then applied to stained Macore wood in layers of 500 $\mu$ thickness, the coated wood plates are aired and then passed twice underneath the scanner of an electron accelerator device (500 kv, 12 m., distance 5 cm., belt velocity 12 cm./sec.). The radiation dose amounts to about 10 Mrad. Immediately after irradiation, the coating produced with batch A is completely cured, whereas that of batch B is still a soft crumbly gel.

EXAMPLE 2

An unsaturated polyester obtained from 1,765 parts maleic acid anhydride, 756 parts glycol, 405 parts 1,3butane-diol and 1,540 parts trimethylol-propane diallyl ether in the presence of 0.83 parts hydroquinone, is dissolved in styrene to give a 75 percent solution. 100 parts of the coating mass so prepared are mixed with 20 parts styrene and 1 part of a cobalt naphthenate solution (Co content 2.2 percent). The resultant solution is divided: batch A is mixed with 2 percent triphenyl-phosphine, referred to the coating mass; batch B is not modified.

The mixtures are then applied to stained Macore wood with a thickness of 250 $\mu$. After airing, the coated wood plates are passed once underneath the scanner of the apparatus described in example 1; the dose amounts to about 10 Mrad. Immediately after irradiation, the coating produced with batch A is tack free and completely cured, whereas that of batch B is very tacky and has only formed a crumbly gel.

EXAMPLE 3

One hundred parts of a coating mass according to example 1 are mixed with 20 parts styrene, 1.5 parts of a 10 percent solution of paraffin (m.p. 52°–54° C.), 1.5 parts benzoin-isopropyl ether and with the additives according to the invention set out in the Table. The solutions so obtained are applied in a layer thickness of 500 $\mu$ to stained plates of Macore wood. The coatings are then pregelled by irradiation with a fluorescent lamp (superactinic, TL-AK 40 W/05 distance 12 cm., duration 90 sec.), and then passed underneath the scanner of the apparatus described in example 1. The results are assembled in the following table:

| Percent additive | Sample immediately after irradiation | Sample 24 hr. later | Oscill. hardness sec., after 24 hr. |
|---|---|---|---|
| No additive | Soft, crumbly gel | Soft, crumbly gel | <60 |
| 0.5 triphenyl-phosphine | Nail-hard | Nail-hard | 100 |
| 1.0 triphenyl-phosphine | do | do | 140 |
| 2.0 triphenyl-phosphine | do | do | 135 |
| 4.0 triphenyl-phosphine | do | do | 170 |
| 2.0 triisopropyl-phosphine | do | do | 150 |
| 2.0 tricyclohexyl-phosphine | do | do | 150 |
| 2.0 tributyl-phosphine | do | do | 122 |
| 2.0 triphenyl-arsine | Not quite nail-hard, but better than without additive. | Not quite nail-hard, but better than without additive. | 80 |

We claim:

1. A process for curing a molding and coating mass containing (a) an unsaturated polyester comprising the polycondensation product of an $\alpha$, $\beta$-ethylenically unsaturated dicarboxylic acid and a polyhydric alcohol and (b) a copolymerizable unsaturated monomeric compound said process comprising adding to said mass, a phosphine, an arsine or a stibine as an initiator and irradiating the mass with high energy electrons, the acceleration voltage thereof being from about 100 to about 3,000 kv. and the radiation dose thereof being from about 5 to about 50 Mrad.

2. The process of claim 1 wherein the initiator is present in the mass in an amount of from about 0.1 to about 5 percent by weight.

* * * * *